United States Patent
Friedt et al.

(10) Patent No.: US 11,176,125 B2
(45) Date of Patent: Nov. 16, 2021

(54) BLENDED RETRIEVAL OF DATA IN TRANSFORMED, NORMALIZED DATA MODELS

(71) Applicant: SAP SE, Walldorf (DE)

(72) Inventors: Martin Friedt, Oftersheim (DE); Baré Said, St. Leon (DE)

(73) Assignee: SAP SE, Walldorf (DE)

( * ) Notice: Subject to any disclaimer, the term of this patent is extended or adjusted under 35 U.S.C. 154(b) by 170 days.

(21) Appl. No.: 16/280,671

(22) Filed: Feb. 20, 2019

(65) Prior Publication Data

US 2020/0133945 A1   Apr. 30, 2020

Related U.S. Application Data

(60) Provisional application No. 62/753,698, filed on Oct. 31, 2018.

(51) Int. Cl.
    *G06F 16/242*    (2019.01)
    *G06F 16/27*     (2019.01)

(52) U.S. Cl.
    CPC .......... *G06F 16/2425* (2019.01); *G06F 16/27* (2019.01)

(58) Field of Classification Search
    None
    See application file for complete search history.

(56) References Cited

U.S. PATENT DOCUMENTS

| | | | | |
|---|---|---|---|---|
| 6,571,232 | B1* | 5/2003 | Goldberg | G06F 16/9574 |
| 9,135,307 | B1* | 9/2015 | Panda | G06F 16/24578 |
| 9,633,076 | B1* | 4/2017 | Morton | G06F 16/248 |
| 10,185,755 | B2* | 1/2019 | Jahankhani | G06F 16/9024 |
| 2006/0287980 | A1* | 12/2006 | Liu | G06F 16/951 |
| 2013/0262520 | A1* | 10/2013 | Mukhin | G06F 16/21 707/802 |
| 2014/0201194 | A1* | 7/2014 | Reddy | G06F 16/248 707/722 |
| 2014/0280287 | A1* | 9/2014 | Ganti | G06F 16/248 707/766 |
| 2015/0317316 | A1* | 11/2015 | Ghanekar | G06F 16/00 707/706 |
| 2017/0098283 | A1* | 4/2017 | Rajan | G06Q 50/01 |

* cited by examiner

Primary Examiner — Christopher J Raab

(74) Attorney, Agent, or Firm — Klarquist Sparkman, LLP

(57) ABSTRACT

Techniques and solutions are described for performing analytics on, or generating displays based on, data retrieved from a plurality of data sources, where the data sources can use one or both of different execution formats or different data schemas. For selected data, one or more analytic queries are generated. Analytic query results are provided in a standardized schema. A blend query is executed against data from the plurality of data sources, including the analytic query results in the standardized schema. Disclosed technologies can facilitate the use of data maintained in different formats or maintained in data sources that have different execution formats or protocols without requiring data replication among the data sources. The disclosed technologies can also provide a platform to which new data sources can easily be added, and can facilitate the use of multiple data sources by non-technical users.

20 Claims, 8 Drawing Sheets

BLENDED RETRIEVAL OF DATA IN TRANSFORMED, NORMALIZED DATA MODELS

CROSS REFERENCE TO RELATED APPLICATIONS

This application claims the benefit of U.S. Provisional Patent Application No. 62/753,698, filed on Oct. 31, 2018, which is hereby incorporated herein by reference.

COMPUTER PROGRAM APPENDIX

A computer program listing appendix, which is hereby incorporated by reference in its entirety for all purposes, is submitted via the electronic filing system (EFS) of the United States Patent and Trademark Office in a text file named CodeAppendix.txt that contains a 18,895 line computer program listing of JSON source code.

FIELD

The present disclosure generally relates to data processing and visualization. Particular implementations relate to combining data from a plurality of data sources into a unified visualization.

BACKGROUND

Data for an organization can be maintained in multiple locations and formats. Often, different software programs are used to access different types or subsets of data in order to perform different types of analysis and other operations. If data from different sources, including data that happens to be organized in a different way (e.g., some or all of the underlying data may be the same between models, but the models are different, such as being in different formats or having different structures) is to be visualized, often, an application specific for that data source is used.

Rather than being able to view data from multiple sources using a single chart or other visualization, a user often will need to prepare and compare data from multiple charts, where each chart might need to be created using a different software application, or otherwise separately created and manipulated. Thus, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for performing analytics on, or generating displays based on, data retrieved from a plurality of data sources, where the data sources can use one or both of different execution formats or different data schemas. For selected data, one or more analytic queries are generated. Analytic query results are provided in a standardized schema. A blend query is executed against data from the plurality of data sources, including the analytic query results in the standardized schema. Disclosed technologies can facilitate the use of data maintained in different formats or maintained in data sources that have different execution formats or protocols without requiring data replication among the data sources. The disclosed technologies can also provide a platform to which new data sources can easily be added, and can facilitate the use of multiple data sources by non-technical users.

In one aspect, a method is provided that can be executed by a computing system that facilitates blending data from multiple data sources, where the data from the data sources is in a plurality of formats. A specification of a first data source and at least a second data source is received. A specification of data to be retrieved from the first data source is received. A specification of data to be retrieved from the at least a second data source is received. A first query format used by the first data source is determined. A first analytic query in the first query format is issued to the first data source. A second query format used by the at least a second data source is determined. The first data source and the at least a second data source use one or both of different data schemas or different query execution formats. A second analytic query in the second query format is issued to the at least a second data source.

A blend query is generated, where the blend query specifies data to be retrieved from data retrieved in response to the first analytic query and the second analytic query. The blend query is configured to be executed on data having a common schema. Blend query results are received. A display is rendered that includes at least a portion of the blend query results.

In another aspect, a method is provided for producing query results from data stored in first and second data models. A first query is received for data associated with a first data model. First query results for the first query are received. The first query results are converted to a standardized format. A second query is received. The second query is for data associated with the first data model and for data associated with at least a second data model. The second query is processed using the converted first query results and at least third query results. The at least third query results are for data associated with the at least a second data model. Second query results for the second query are returned.

In a further aspect, a method is provided for executing a blend query on data retrieved from a plurality of analytic engines. First query execution results are received. The first query execution results are associated with a first analytic engine and are in a standardized schema. Second query execution results are received. The second query execution results are associated with a second analytic engine and are in the standardized schema. The first query execution results are converted to a first set of one or more tables. The second query execution results are converted to a second set of one or more tables.

A blend query is received. The blend query specifies data to be retrieved from the first set of one or more tables and the second set of one or more tables. The blend query also specifies how at least one attribute of the first set of one or more tables should be mapped to an attribute of the second set of one or more tables. The blend query is executed. The executing includes selecting at least a portion of data maintained in the first set of tables and at least a portion of data maintained in the second set of tables. The blend query execution results are formatted in a manner specified at least in part by the blend query. Blend query results are returned in response to receiving the blend query.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

Example 1—Overview

Figure 1:
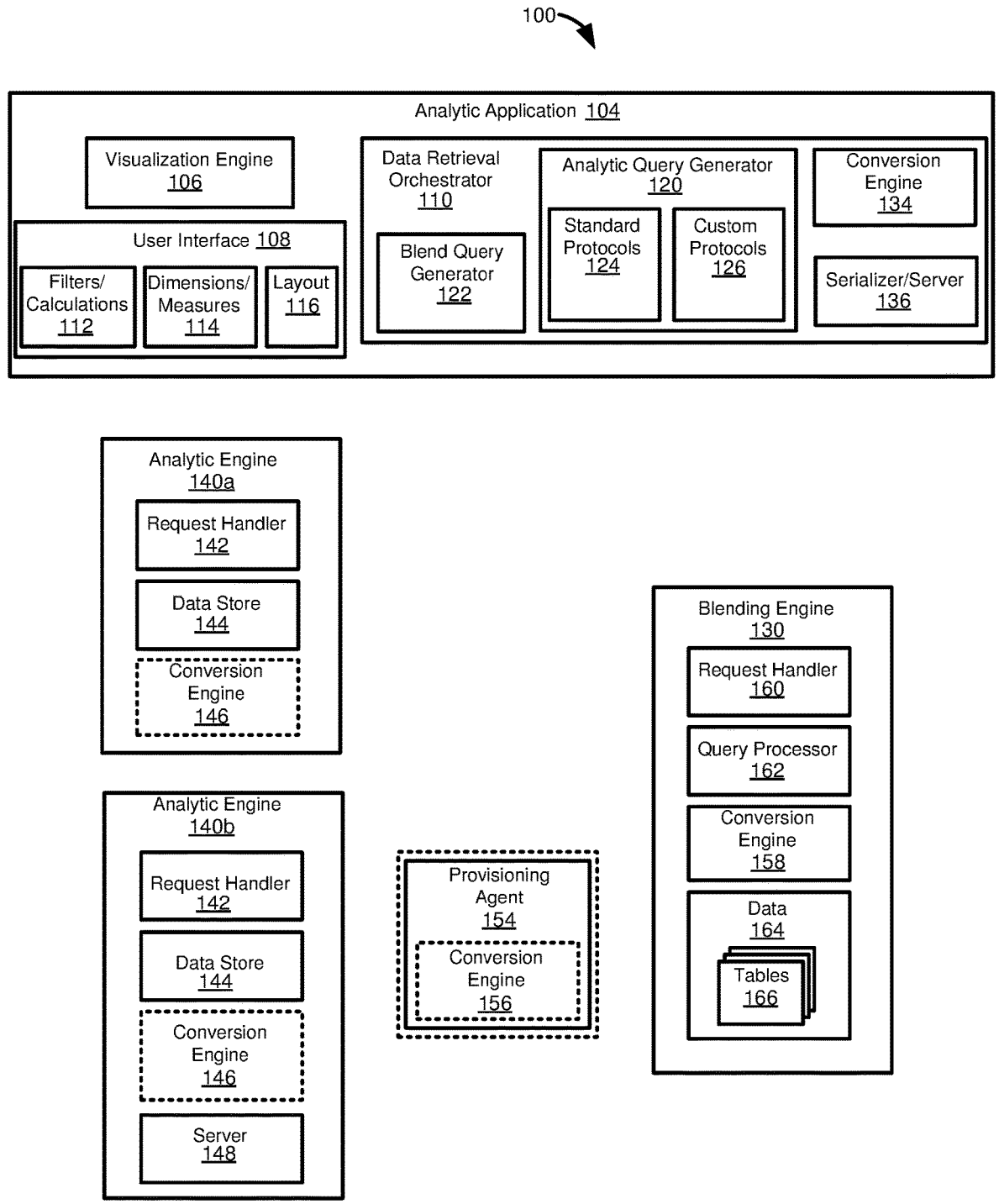
FIG. 1 is a diagram illustrating a computing environment in which disclosed technologies can be implemented.

Data for an organization can be maintained in multiple locations and formats. Often, different software programs are used to access different types or subsets of data in order to perform different types of analysis and other operations. If data from different sources, including data that happens to be organized in a different way (e.g., some or all of the underlying data may be the same between models, but the models are different, such as being in different formats or having different structures) is to be visualized, often, an application specific for that data source is used. Rather than being able to view data from multiple sources using a single chart or other visualization, a user often will need to prepare and compare data from multiple charts, where each chart might need to be created using a different software application, or otherwise separately created and manipulated.

Linked Analysis refers to the connection of two or more charts/tables/geo maps of the same data, such that a change to the representation (filter, drill) in one affects the representation in the other. Linked analysis is called "linked" not because of a model link on dimensions, but because it links a set of widgets (charts/tables/geo maps) where one or more widgets can be drivers and/or receivers of filtering/drilling operations. In typical scenarios, by default, linked analysis can only be carried out with charts/tables/geo maps using the same model. When filtering across models is enabled, such as using the disclosed technologies, linked analysis can be performed with charts/tables/geo maps that use different models. To enable filtering across models, a user typically sets up a link between the models, such as in a "story" or "Linked Dimensions" dialog, which means that one defines which dimensions of one model link to which dimensions of the other model.

Blending can refer to combining data from multiple models (accounts and/or measures and/or live data) in one chart/table. To provide for blending, dimensions can be linked in a similar manner as for linked analysis. Blending can allow, for example, filtering across models in the visualization. Remote blending is a particular form of blending where at least one model of a plurality of models being used and blended is associated with a remote data source (e.g., on a separate computing device or system, but in some cases remote can include data sources that are on a common computing system or device, but are remote in the sense that they are outside the access scope or processing abilities of a given analytic application).

A model is a representation of data. In particular, the model can be a model of data that includes measures and dimensions, such as for an OLAP model. A model can be a representation of data for an organization, such as organized into dimensions and measures. A query can be defined to analyze data in a model. The present disclosure relates to remote blending of data from multiple models, where all or a portion of the models are associated with different analytical engines. As an example, taking products of SAP SE of Walldorf, Germany, in ANALYTICS CLOUD, HANA EPM-MDS (SAP HANA Enterprise Performance Management-SAP HANA Multidimensional Service) can be used as one of the analytic engines. SAP BW can be used as another analytic engine. However, other analytic engines can be used, such as analytic engines that process logical data objects (such as SAP BUSINESS OBJECTS). A blending engine can execute a blend query (such as for use with a visualization) using normalized query results obtained from the analytic engines.

Disclosed technologies can facilitate manipulating and visualizing data from multiple data sources, including at least one remote data source, by converting data to a common format or schema. In particular, a user of an analytics application can select, such as via a user interface, data that the user would like to view, data sources from which data should be retrieved, and, optionally, relationships between data from different data models. The user selections can be converted into a plurality of data requests, or analytic queries, that are sent to a plurality of data sources, or analytic engines, where at least one of the data sources is a remote data source. In some cases, rather than a data source being remote, the disclosed techniques can be used with data sources that are "local," or have an equivalent relationship (e.g., both being available in cloud environments), but the data sources natively provide data in different formats, such as the use of a different data model or a different output format, or have different query execution formats, protocols, or operations.

The common format or schema can be referred to as a blend model. The blend model defines mapping relations between components (e.g., dimensions and measures) of the models, the mapping type (such as a join types, for example left-outer join, inner join, or union), and the data sources. That is, for example, data associated with different models can be mapped to a common, normalized model. In some cases, a transformation between a source model and a normalized model can be manually defined. In other cases, all or a portion of the transformation definition can be automated, such as mapping a first model to the normalized model, and then looking for corresponding model or data elements from a second model and then applying a corresponding transformation as for the first model. In particular examples, the transformations can be accomplished using the XSLT language. However, analogous transformations can be accomplished in other languages (e.g., C++, JAVASCRIPT).

As an example, consider a first dimension A in a first model that is mapped to dimension B in a normalized model, and is associated with the value "1X." If the second model also has dimension A, or a dimension that corresponds to dimension A but has a different identifier (say, dimension C), a transformation engine can create a transformation procedure for the second model that maps dimension A to dimension B (or C), as in the transformation definition for the first model. Similarly, if the transformation engine identifies that the value "1X" in data for the second model, and that value is associated with dimension D in the second model, the transformation engine can map dimension D to dimension B based on the mapping for the first model. Or, in another example, dimension B (or C) may not exactly correspond to dimension A, but may otherwise be related, such as describing different aspects of a common measure.

In various examples, a structure, values, or both can be mapped between models. For example, if a first model has dimensions and measures in first structure, but a second model is in a different, second structure, the first model can be transformed from the first structure to the second structure. If the first model has dimensions from a first namespace and the second model has dimensions from a second namespace, corresponding dimensions can be transformed from the first namespace to the second namespace. If both the structure and namespace are different between models, the structures and namespaces can both be transformed. In a particular example, for models that include dimensions and measures, dimension and measure structures, as well as dimension names, are mapped for transformation between models, but measure to measure name mapping is not performed. In another example, dimension names and measure structures are mapped for transformation between models, but dimension structures and measure names are not mapped.

A blend query can provide a query representation of each model that is to be blended. With that, cross-model operations can be executed, like cross model calculated measures, and some operations can be performed on data for all the blended models using a blending engine, rather than having each analytic engine carry out calculations etc. on individual models. That is, once the normalized model data is available, the normalized data can be manipulated as a unit (e.g., the data from multiple models jointly manipulated), which reduces the amount of data that needs to be retrieved and sent, and which can speed processing time by reducing communications between applications (e.g., between a visualization component or blending component and analytic engines for the data models being blended).

In a particular implementation, an infrastructure for providing remote blending can use a two-level query approach. Each query ("analytic engine query" or "analytic query") which is part of the blend is defined for the appropriate, respective analytic engine, and is executed by such analytic engine. In that way, the entire feature set of the analytic query can be exposed, independently of the different capabilities of the analytic engines (e.g., a feature provided by a first analytic engine can be used even if that feature is not provided by a second analytic engine). A blend query is executed on top of the different analytic engine query result sets from the analytic engine queries based on the blend model definition in a blending engine. A blend model data source definition can define where to fetch the result set data of each blended data source. The result set format of each analytic engine query can be a normalized metadata representation of the data—the VIEW—and the data itself—the CUBE.

Using a blend query on top of results provided by analytic engine queries allows the entire feature set and power of each analytic engine to be reused, the data volume to transfer to the blending engine minimized (since further data manipulations are performed on top of the existing result set, not sent to the analytic engines), and, for the grid representation (chart/table) or other visualization, the blend query behaves like any other single native query.

The data requests, or analytic queries, are sent to the various data sources, or analytic engines, for execution. Data requests can be in the form of an analytic query, where an analytic query is a query that will be performed in an individual data source (or analytic engine). A given analytic query can include a metadata request, that indicates particular data that should be retrieved (e.g., particular attributes, such as dimensions or measures), as well as an analytic request, which can include particular data that should be selected from data specified in the metadata request, operations that should be performed on the particular data (e.g., filtering, calculations), display or rendering information (e.g., hierarchical relationships between attributes, on which axis an attribute should be displayed), or a combination thereof.

The data requests can be, or be converted to, a format that is natively used by a respective data source. For instance, in the case of a data source that includes a relational database management system, the request can be, or can be converted to, a query, such as in the structured query language. Data retrieved from a particular data source in response to a particular request (or set of requests) can be converted to a common schema or format. In a particular example, the common schema can include a metadata description of the retrieved results, referred to as a VIEW, and a description, referred to as a CUBE, that includes metadata, optionally including visualization metadata, and retrieved data values. That is, for example, the VIEW description can be equivalent to information that might be maintained in a database schema to describe various tables and table elements, but does not include the actual data contained in the tables. The CUBE can include actual data values, as well as metadata, including all or a portion of the metadata of the VIEW, other metadata (including, for example, metadata describing how the data should be rendered in a display or visualization), or a combination thereof.

The VIEW and CUBE descriptions can be used to generate data in an intermediate format, such as in the form of relational database tables. The intermediate format can be a format that is convenient for query processing. A blend query can be received, which requests all or a portion of the data in the intermediate format that was returned from the analytic queries executed on the individual data sources. Like the analytic queries, the blend query can include a metadata request and an analytic request, which can be at least generally similar to the metadata and analytic requests of the analytic queries. However, the blend query is executed against data retrieved from a plurality of data sources.

In addition, the blend query, such as in the metadata request, can indicate how data from a first data source should be joined with, or mapped to, data from a second data source. Similarly, the analytic request of the blend query can include information describing how data from different data sources is related, calculations or other operations that should be performed on data from multiple data sources, and information describing how data from different data sources should be displayed in relation to one another. The response to the blend query, like the response to the analytic query, can be in a standardized format that is useable by the analytics application. In a particular example, the response to the blend query can include a VIEW and a CUBE, which can be at least generally similar to the VIEW and CUBE described for the results of the analytic queries.

The disclosed technologies can provide various advantages. For example, they can facilitate retrieving, manipulating, and visualizing data from different data sources, which might have different data retrieval methods and different storage or result formats, without having to replicate data between data sources. Further, the disclosed technologies can provide a framework that facilitates adding new data sources for use by an analytics application. The enhanced interoperability provided by the disclosed techniques can thus reduce programming overhead, as well as computing overhead by avoiding replicated data, and reducing data transfer and processing. The disclosed technologies also facilitate the use of data from different data sources by non-technical users, as a user can simply specify data sources to be used, and optionally some relationships between data, and the underlying framework can handle details of data retrieval and conversion to a format useable by the analytics application.

Example 2—Example Architecture for Blend Queries

FIG. 1 illustrates an architecture 100 in which disclosed technologies can be implemented. The architecture 100 includes an analytic application 104, which includes a visualization engine 106, a user interface 108, and a data retrieval orchestrator 110. The visualization engine 106 can generate data visualizations, including displaying results in tabular form or in a graphical representation (e.g., line chart, bar chart, pie chart) using data from various data sources, including those based on data received from the data retrieval orchestrator 110.

The user interface 108 can include graphical user interface elements that allow a user to perform various actions in requesting, manipulating, or visualizing data. In particular, the user interface 108 can include elements that allow a user to define analysis and visualization parameters that can be used to generate analytic and blend queries, whose execution can then be orchestrated by the data retrieval orchestrator 110. The user interface 108 can include filter/calculation elements 112, which can set filters for data to be retrieved, analysed, or displayed, attribute selectors, such as selectors 114, useable to select particular dimensions or measures to be retrieved/processed, and layout selectors 116, such as to define a particular analysis or visualization type and how various data should be presented (e.g., attributes that should appear on an x-axis or a y-axis). The user interface 108 can include additional functionality. For example, the selectors 114 can include functionality allowing a user to select various data sources from which attributes may be selected, and to map or join attributes from one data source to attributes from another data source.

The data retrieval orchestrator 110 can include an analytic query generator 120 and a blend query generator 122. The analytic query generator 120 can determine data sources to be used for a particular analysis or visualization, such as those associated with selections made via the user interface 108, particularly data to be retrieved from such data sources, and can cause a data request to be issued to the appropriate data sources. In some cases, the analytic query generator 120 can use a standard protocol 124, such as the INA (information access) protocol or SDI (HANA SMART DATA INTEGRATION) protocol used by products of SAP SE of Walldorf, Germany. In other cases, the analytic query generator 120 can use a custom protocol 126. A custom protocol 126 can be a particular protocol that is directly useable by a data source, or which the data source is natively able to convert to a useable format. For example, if a data source is a relational database, the custom protocol 126 can be SQL. Typically, data sources are registered with the data retrieval orchestrator 110 and associated with one or more of the standard protocols 124 or the custom protocols 126. In a particular implementation, the data retrieval orchestrator 110 can be, or can include or otherwise utilize, FIREFLY (a semantic analytic layer using INA as a data exchange protocol), available from SAP SE of Walldorf, Germany.

As will be further described, results of the analytic queries issued by the analytic query generator 120 can be converted to standard format, and can be stored in, or otherwise be accessible to, a blending engine 130. User input provided through the user interface 108 can be parsed by both the analytic query generator 120 and the blend query generator 122 to generate, respectively, analytic queries and a blend query. The blend query can be executed by the blending engine 130.

The data retrieval orchestrator 110 can optionally include a conversion engine 134. The conversion engine 134 can convert data between schemas or models, or formats. For example, the conversion engine 134 can convert results between abstract data types or relational database tables and a serialized format, such as JSON. The conversion engine 134 may also interconvert data to or from a standardized schema, such as a VIEW or CUBE, as described herein. The conversion engine 134 may be useful when data conversion is not accomplished by another component of the architecture 100. In at least some cases, other components of the architecture 100 accomplish data conversions and the conversion engine 134 can be omitted or not used.

The data retrieval orchestrator 110 can include a serializer/server component 136. The serializer/server component 136 can be responsible for sending data to other components of the architecture 100, such as to the blending engine 130. That is, for instance, in some cases the data retrieval orchestrator 110 can receive results from analytic queries and can transmit such results (optionally converted by the conversion engine 134) to the blending engine 130, which can then process a blend query on the data. If the data is not already in a serialized format, such as JSON, the serializer/server 136 can convert the data to a serialized format. If data from analytic queries is provided to the blending engine 130 in another manner, the serializer/server 136 can be omitted or not used.

Although shown as part of the analytic application 104, all or a portion of the components of the data retrieval orchestrator 110 (and optionally, the visualization engine 106) can be provided by another component of the architecture 100. For example, the data retrieval orchestrator 110 can be a framework service that is accessible to a plurality of analytic applications, including the analytic application 104.

Analytic queries generated by the analytic query generator 120 can be sent to analytic engines 140 (analytic engines 140a, 140b are shown). Analytic engines 140 may be of various types, such as based on whether a response to the analytic query (e.g., results) is provided to the blending engine 130 through the data retrieval orchestrator 110 or by another component. The analytic engines 140 can include respective request handlers 142. A request handler 142 can receive an analytic query from the data retrieval orchestrator 110 and cause the query to be executed on a data store 144 of the respective analytic engine 140. In at least some cases, the request handler 142 can convert the analytic query to a form that is executable by the analytic engine 140. As an example, the analytic query can be in the INA format, which is recognized by a particular analytic engine 140, but is converted to another format (e.g., to a SQL query, or another series of commands recognized by the analytic engine) before execution.

An analytic engine 140 can optionally include a conversion engine 146. The conversion 146 can perform operations at least similar to those performed by the conversion engine 134. In particular, the conversion engine 146 can convert analytic query results to a particular model or schema (e.g., a VIEW or CUBE), or a particular format (e.g., a serialized format, such as JSON). Generally, the architecture 100 is configured to work with a variety of analytic engines 140, including those that are natively capable of performing operations associated with the conversion engine 146, and those that are not. Typically, it can be more efficient to use any capabilities that are provided by a particular analytic engine 140, such as using a conversion engine 146 when available. In addition, an overall advantage of the disclosed technologies is that analytic queries can be processed using the request handlers 142, which can leverage any advanced processing capabilities of a particular analytic engine 140, rather than limiting queries to operations that are supported by all analytic engines (e.g., being limited to operations provided by SQL).

An analytic engine, such as analytic engine 140a can be configured to return results, optionally converted by the conversion engine 146, to the data retrieval orchestrator 110, which in turn can provide the results to the blending engine 130. Other analytic engines, such as analytic engine 140b, can directly provide the results, optionally converted by the conversion engine 146, to the blending engine 130 using a server 148. Or, the server 148 can provide results to a provisioning agent 154. The results can optionally be converted to a standard format by the conversion engine 146 prior to being sent to the provisioning agent 154. Or, the provisioning agent 154 can include a conversion engine 156 for converting results to a standard format. In a yet further implementation, the results can be converted by another component of the architecture 100, such as a conversion engine 158 of the blending engine 130. Although shown as a separate component, in some cases, the provisioning agent 154 can be incorporated into another component of the architecture 100, such as the blending engine 130, or can be implemented in a common computing system or device that operates one or more other components of the architecture.

The blending engine 130 can include a request handler 160 configured to process blend queries received from the data retrieval orchestrator 110. In particular, the request handler 160 can convert requests (e.g., metadata and analytic requests) of a blend query into a format that can be executed by a query processor 162. The query processor 162 can operate, in a particular example, using a query language (e.g., SQL) on data 164 that represents the results of analytic queries from individual analytic engines 140. In a particular example, the data 164 can be stored in the form of tables 166, such in a relational database management system. The conversion engine 158 can process results from analytic queries, such as in a standardized format, and store the processed (e.g., converted) results in the tables 166.

Example 3—First Example Analytic and Blend Query Execution Process

Figure 2:
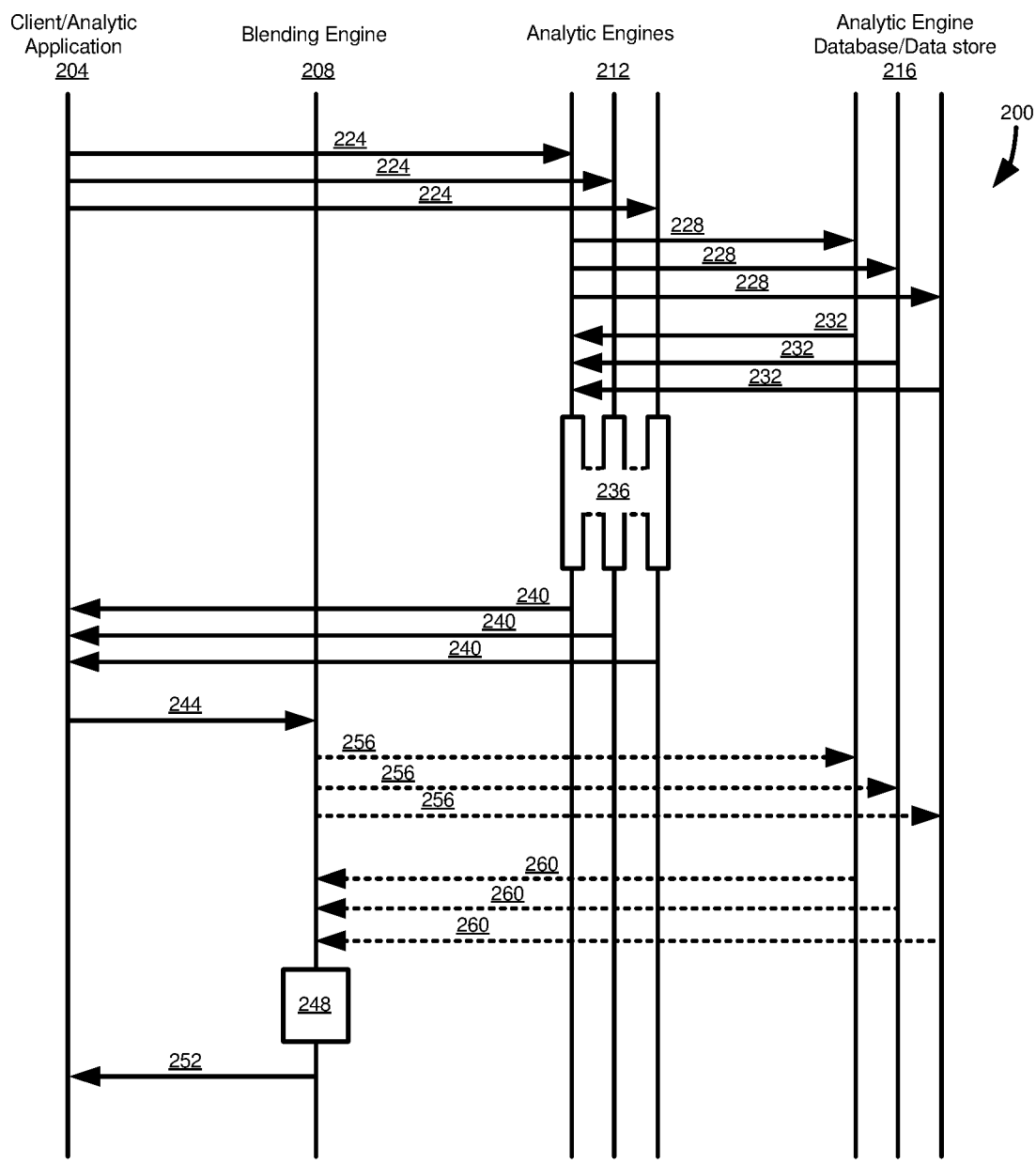
FIG. 2 is a diagram illustrating operations in an embodiment of executing analytic queries and a blend query, where an analytic engine provides analytic query results in a standardized format.

FIG. 2 illustrates a process 200 for executing a blend query, such as using the architecture 100 of FIG. 1. The process 200 includes operations occurring at a client/analytic application 204, a blending engine 208, a plurality of analytic engines 212 (e.g., components of particular data sources that process data retrieval requests), and a plurality of databases or other data stores 216 associated with the analytic engines 212.

The client application 204 issues a data request that includes data from multiple data sources that is to be processed using a blend query. The data request can be separated into a plurality of analytic queries 224 to be processed by the analytic engines 212, and a blend query to be processed by the blending engine 208. The plurality of analytic queries 224 are sent to respective analytic engines 212. The analytic engines 212 process the analytic queries 224, including issuing operations 228 to retrieve data from the respective databases/data stores 216.

Data responsive to the analytic queries 224 is returned from the database/data stores 216 to the analytic engines 212 in responses 232. At 236, the data responses are converted to a standardized format, such as a VIEW and CUBE in a particular schema. The standardized format can also be a serialized format, such as JSON. Results in the standardized, serialized format are sent to the client application 204 (e.g., to the blend query orchestrator 110 of FIG. 1) in responses 240.

The client application 204 issues a blend query 244 to the blending engine 208. The blend query 244 can include the data from the responses 240. The blending engine 208 processes the blend query at 248. Processing the blend query at 248 can include converting requests of the blend query (e.g., a metadata request and an analytic request) to a format that can be used to retrieve appropriate data from results of the analytic queries, such as generating a query in a query language that can be executed against database tables holding the analytic query results. Processing the blend query at 248 can also include formatting the blend query results, such as in a standardized format (e.g., a VIEW and CUBE), which may also be a serialized format (such as JSON). Results of the blend query are returned from the blending engine 208 to the client application 204 in responses 252.

Various modifications can be made to the process 200. For example, rather than data being returned to the client application 204 in the responses 240, the responses can indicate that the analytic queries were completed. Results in the standardized, optionally serialized, format can be stored at the database/data stores 216 prior to the responses 240 being sent. The blend query request 244 can include identifiers for data to be used with the blend query, such as information sufficient to retrieve the stored analytic query results stored in the databases/data stores 216. Such information can be sent from the databases/data stores 216 in requests 256, and results provided to the blending engine 208 in responses 260. The processing 248 and responses 252 then be carried out otherwise as described above.

Example 4—Second Example Analytic and Blend Query Execution Process

Figure 3:
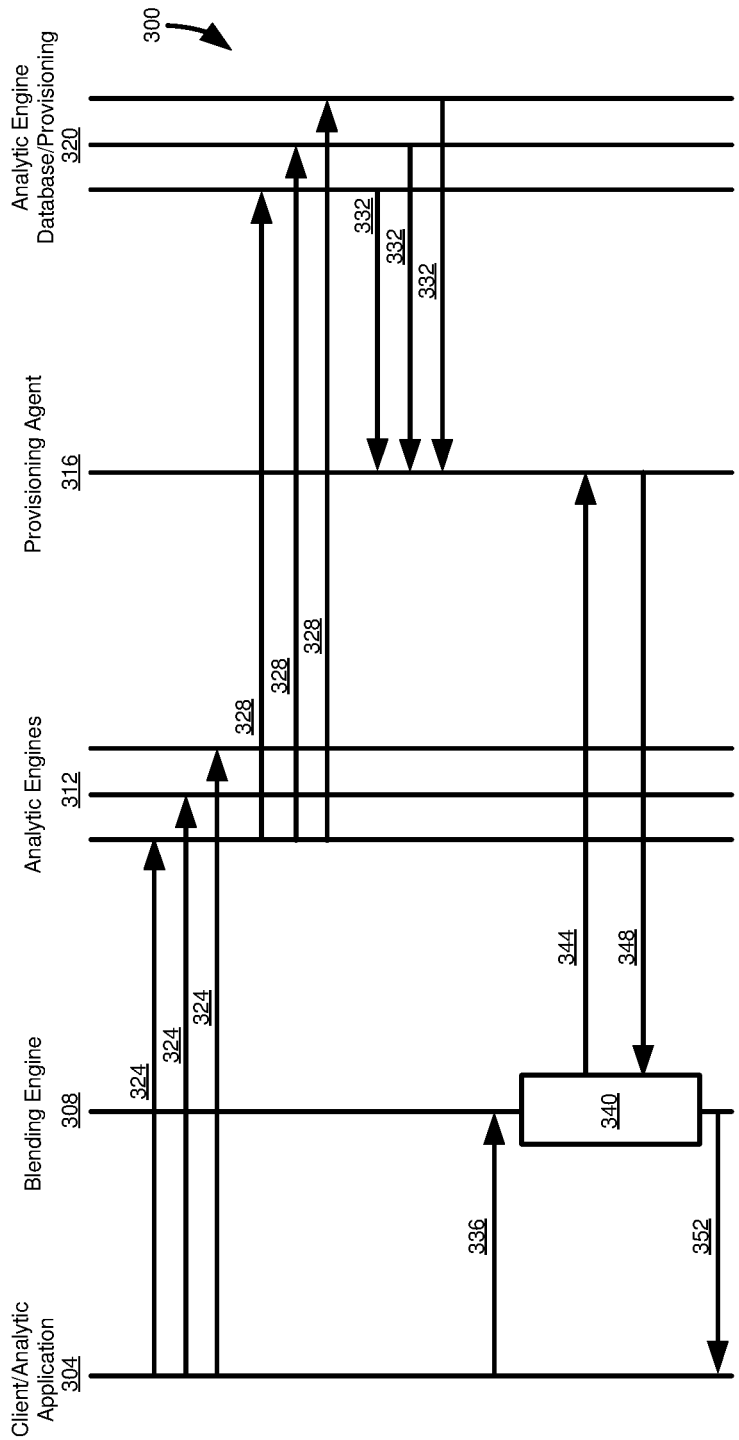
FIG. 3 is a diagram illustrating operations in an embodiment of executing analytic queries and a blend query, where a blending engine converts analytic query results to a standardized format.

FIG. 3 illustrates a process 300 for executing a blend query, such as using the architecture 100 of FIG. 1. The process 300 includes operations occurring at a client/analytic application 304, a blending engine 308, a plurality of analytic engines 312 (e.g., components of particular data sources that process data retrieval requests), a provisioning agent 316, and a plurality of databases or other data stores 320 associated with the analytic engines 312.

The client application 304 issues a data request that includes data from multiple data sources that is to be processed using a blend query. The data request can be separated into a plurality of analytic queries 324 to be processed by the analytic engines 312, and a blend query to be processed by the blending engine 308. The plurality of analytic queries 324 are sent to respective analytic engines 312. The analytic engines 312 process the analytic queries 324, including issuing operations 328 to retrieve data from the respective databases/data stores 320.

Data responsive to the analytic queries 324 is sent from the database/data stores 320 to the provisioning agent 316 in responses 332. Optionally, the responses 332 can have the data converted to a standardized format, such as a VIEW and CUBE. The standardized format can also be a serialized format, such as JSON. Or, the responses 332 can be converted to such format after being received by the provisioning agent 316. In another example, analytic query results can be sent to the provisioning agent 316 by the analytic engines 320, or from the provisioning agent to the blending engine 308, prior to the request 344 being sent (and, if already provided to the blending engine, the blending engine can retrieve the received result with sending the request 344 or receiving the response 348).

The client application 304 issues a blend query 336 to the blending engine 308. The blend query 336 can include information sufficient to identify data to be used in the blend query, and to be retrieved from the provisioning agent 316. The blending engine 308 processes the blend query at 340. Processing the blend query at 340 can include converting requests of the blend query (e.g., a metadata request and an analytic request) to a format that can used to retrieve appropriate data from results of the analytic queries, such as generating a query in a query language that can be executed against database tables holding the analytic query results. In a particular example, part of the processing 340 includes issuing a request 344 to the provisioning agent 316 for information to be used with the blend query. Data for the blend query is received from the provisioning agent 316 in a response 348.

Processing the blend query at 340 can also include formatting the blend query results, such as in a standardized format (e.g., a VIEW and CUBE), which may also be a serialized format (such as JSON). Results of the blend query are returned from the blending engine 308 to the client application 304 in a response 352.

Example 5—Example Analytic Query and Blend Query Components and Processing

Figure 4:
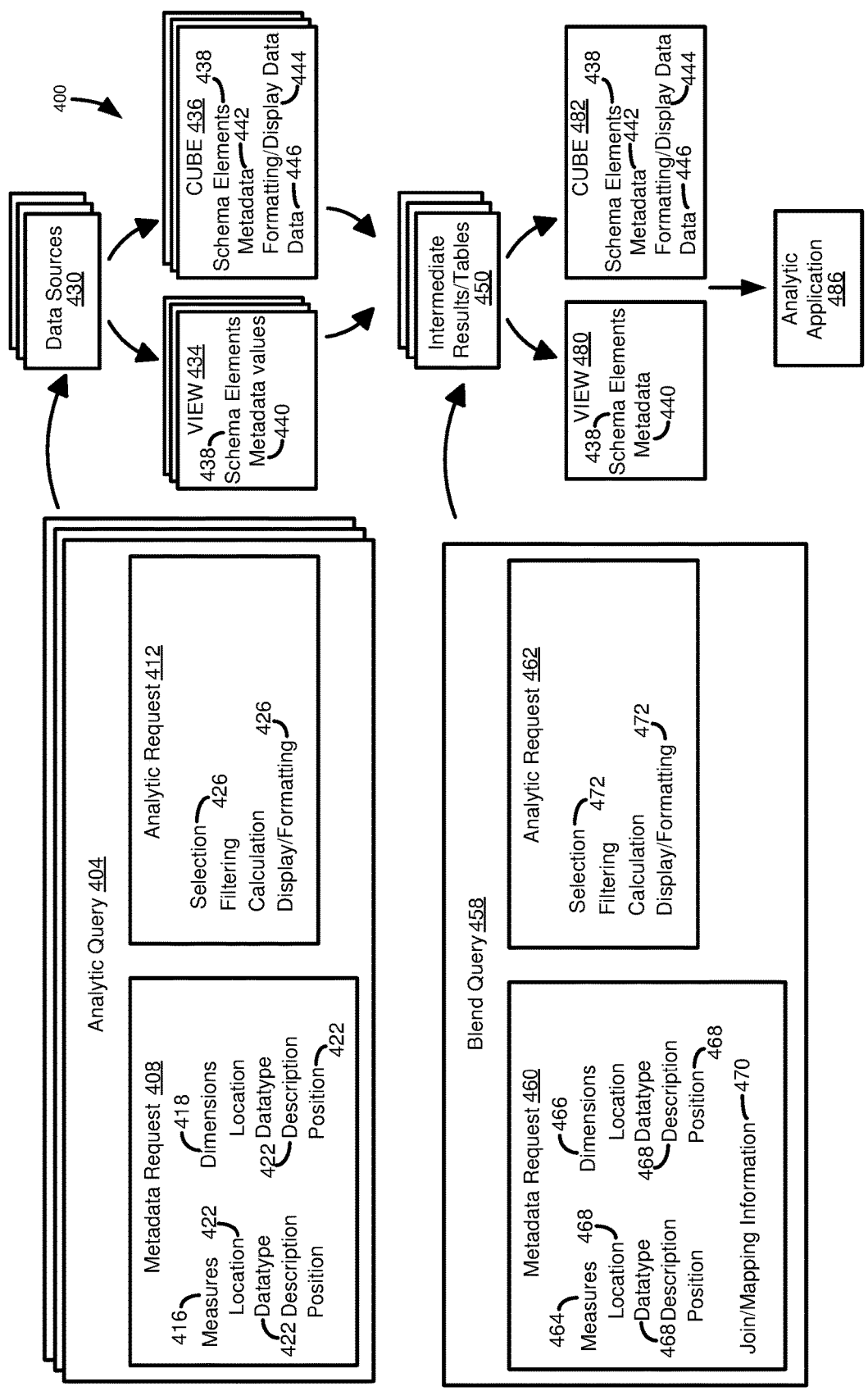
FIG. 4 is a diagram illustrating components of analytic queries and a blend query, and how analytic query results can be processed and used for execution of the blend query.

FIG. 4 provides additional details for how analytic queries and blend queries can be processed, with reference to a process 400. The process 400 includes one or more analytic queries 404. An analytic query 404 can include multiple components, including a metadata request 408 and an analytic request 412. The analytic query 404 is typically issued for each data source that is to be included in an analysis or visualization.

In some cases, parameters for an analysis or visualization may change, or a user may wish to obtain updated results (e.g., so that the analysis includes changes to data that have occurred since a previous time data was acquired). That is, at least in some implementations, data retrieved in response to an analytic query 404 can be stored or cached. The stored data can be provided with an expiration date, or an indication otherwise provided that new data should be obtained upon particular conditions being met. The retention period, or a refresh request, can be different for different data sources. In particular, it may be expected that some data sources will change less frequently than others, or that changes to some data sources will be more critical to an analysis or visualization than for other data sources. Thus, analytic queries 404 for less than all data sources to be used in a blend query can be issued, in some cases.

The metadata request 408 can indicate particular data that should be retrieved. For example, the particular data can represent particular attributes for particular objects (e.g., entities in a database model, or instances of an abstract or composite data type that represents a particular object, such as an analog world object or some other collection of related data attributes). In particular, the analytic query 404 can be used in conjunction with OLAP processing, and can include one or more measures 416 and one or more dimensions 418 that are to be retrieved for a particular analysis or visualization.

In addition to specifying particular measures 416 or dimensions 418 to be retrieved, the metadata request 408 can specify particular metadata elements 422 to be retrieved for each measure or dimension. The metadata elements 422 can specify, for example, a location (e.g., a particular database table), a datatype (e.g., float, int, string), a description (e.g., a textual description of the meaning or use of the corresponding attribute), and a position (e.g., if the attribute corresponds to a field in the database table, the left-to-right position of a column corresponding to the attribute). In at least some cases, the metadata elements 422 can correspond to information that would be included in a schema for the attribute in a database, such as information maintained in an information schema or a data dictionary.

The analytic request 412 can include instructions 426 specifying how data associated with the metadata request 408 should be processed. The instructions 426 can include instructions for selecting particular measures 416 or dimensions 418 to be included in a particular analysis or display. Selecting particular measures 416 or dimensions 418 in an analytic request 412 can be useful when a user may wish to alter an analysis or visualization using data specified in the metadata request 408. That is, the metadata request 408 may specify that more data should be retrieved than will be used for a particular analytic request 412. Later, another analytic request 412 may be issued that includes a metadata request 408 that is identical to, or overlaps with, an earlier metadata request. If the earlier metadata request 408 is identical to the later metadata request, the new analytic request 412 can use results provided in response to the earlier metadata request, but can apply the instructions specified in the later analytic request. If the later metadata request 408 differs from the earlier metadata request in that the later request uses data not present in the earlier request, at least a portion of the later metadata request can be executed to provide such additional data. Or, in other cases, if the metadata requests 408 are not identical, the later metadata request can be executed and then the later analytic request 412 applied to the results.

The instructions 426 can further include operations such as filtering (e.g., only measures 416 or dimensions 418 having values meeting particular criteria will be returned or used in an analysis or visualization), performing specified calculations on values for measures or dimensions, and applying formatting or other processing to facilitate the rendering of a display or the performance of an analysis. For example, formatting can include specifying a hierarchical relationship between particular measures 416, dimensions 418, or combinations thereof.

As previously described, the analytic queries 404 can be sent to, and executed by, data sources 430, which can also be referred to as analytic engines. A particular analytic query 404 can be tailored to the specific data source 430 to which it is directed. That is, the analytic query 404 may request the data (i.e., measures 416 and dimensions 418) maintained in the data sources 430, and may be in a format that can be processed by the data source.

Results of analytic queries 404 processed by the data sources 430 can be provided in a standardized format, such as in the form of a VIEW 434 and a CUBE 436. The VIEW 434 can include the schema elements 438 (e.g. dimensions 416 and measures 418) specified in the metadata request 408, and corresponding metadata values 440. For example, if the metadata request 408 includes a request for an attribute A, and a value for a datatype associated with attribute A, the VIEW 434 can specify that the datatype is an integer.

The CUBE 436 can include information for schema elements 438 specified in the metadata request 408, including additional metadata 442, formatting and display data 444 (e.g., indicating where particular schema elements should be displayed, and how they should be displayed with respect to one another), and actual data 446 corresponding to instances of the schema element maintained in the data store 430. Continuing the example of attribute A, a data source 430 may maintain records having values of 1, 5, 242, 10 for attribute A. The VIEW 434 can be used, at least in part, to influence properties of the CUBE 436, such as the datatype specified in the VIEW determining the datatype of the values in the CUBE. One benefit of the VIEW 434 and CUBE 436 is that they can be self-describing. That is, the CUBE 436 can include actual data values, along with semantic information as to what the data values represent, and information that can influence how the data values will be processed or displayed. Further, the VIEW 434 and CUBE 436 can be provided in a serialized format, which can facilitate their use by other computer systems or components.

The VIEW 434 and CUBE 436 can be processed to provide intermediate results 450, which can be stored, such as in database tables. In some cases, the results of the VIEWS 434 and CUBES 436 from multiple data sources 430 are combined in a common table or set of tables. In other cases, the results from each data source 430 are maintained in separate database tables or sets of database tables.

The intermediate results 450 can be accessed by a blend query 458. The blend query 458 can be similar to the analytic queries 404, in at least some respects. For example, the blend query 458 can include a metadata request 460 and an analytic request 462, which can be at least generally similar to the metadata request 408 and the analytic request 412 of the analytic query 404. The metadata request 460 can include specifications of attributes, such as measures 464 and dimensions 466, to be retrieved by the blend query 458, and which can be at least a portion of the measures 416 and dimensions 418 of the analytic query 404. However, the blend query 458 includes measures 464 and dimensions 466 that are associated with multiple data sources 430, as opposed to a single data source, as for the analytic queries 404. The metadata request 460 can include metadata elements 468 for the measures 464 and dimensions 466, which elements can be similar to the metadata elements 422 of the analytic queries 404.

The metadata request 460 can include information beyond that included in the metadata request 408, such as join or mapping information 470. The join/mapping information 470 can specify how attributes from one data source 430 should be mapped to, or joined with, data from another data source. For example, data sources 430 may have at least one dimension 464 or measure 466 in common, and can be used to retrieve related measures and dimensions that are stored in separate data sources 430.

The analytic request 462 can be at least generally similar to the analytic request 412 of the analytic queries 404, such as including information 472 describing parameters or operations, such as selecting, filtering, calculations, display or formatting information, or combinations thereof.

The blend query 458 can be executed against the intermediate results 450 to provide results in a standardized format, which can also be a serialized format. The results can be in the form of a VIEW 480 and a CUBE 482, which can be at least generally similar to the VIEW 434 and the CUBE 436. The VIEW 480 and the CUBE 482 can be provided to an analytic application 486, where the analytic application can then render or otherwise process the information in the VIEW and CUBE. In at least some cases, the information in the CUBE 482, such as the data 446, can be deserialized, such as into instances of an abstract or composite data type used by the analytic application 486.

Example 6—Example Blend Query Definition and Visualization Using Same

Figure 5:
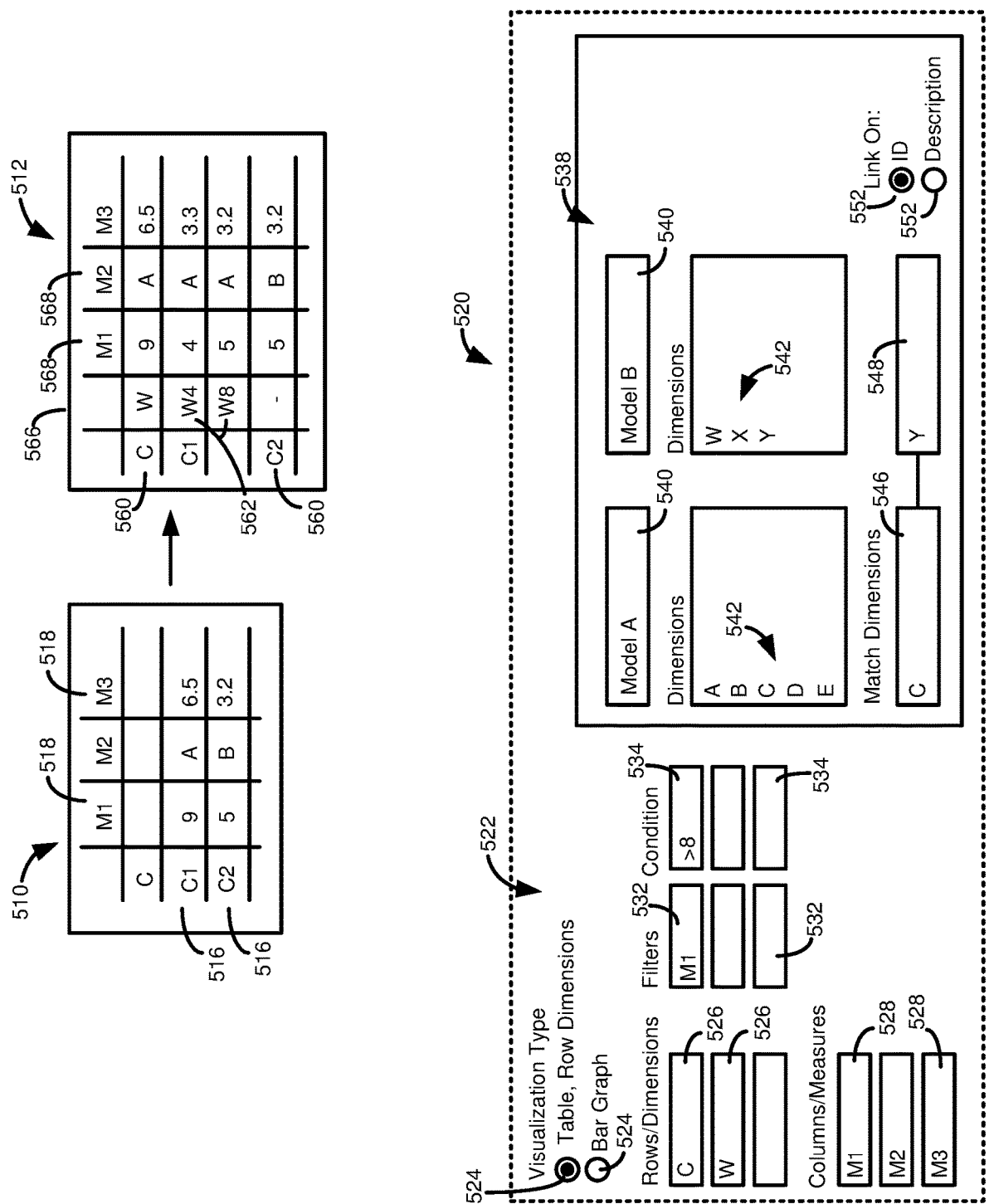
FIG. 5 is an example user interface screen where a user can provide input that can be used to generate analytic queries and a blend query.

FIG. 5 illustrates a visualization 510 using data from a single data source, and how the visualization can be modified to a visualization 512 that includes data from a second data source using disclosed technologies.

The visualization 510 is presented in the form of a chart or table, and includes rows 516 and columns 518. The rows 516 can correspond to particular dimensions, and the columns 518 can correspond to values for particular measures associated with such dimensions. Specifically, the chart includes a dimension C, with values for dimension C of C1 and C2, each of which serves as a row 516. Values for measures M1, M2, M3 are provided in columns 518 for each dimension value.

A user interface screen 520 can display options for creating the visualization 510, such as options for selecting a particular data source, particular dimensions and measures to be included in a display or analysis, a type of visualization or analysis to be generated, and various options related to the visualization or analysis. The user interface screen 520 can present options that can allow the visualization 512 to be generated, such as provided in a display 522 of blending user interface elements. The display 522 can include user interface elements 524 that can allow a user to select a particular visualization type, such as a graph or a bar chart. A shown, the user interface element 524 for a table, with dimension values forming rows of the table, has been selected. A user can enter particular dimensions to be included in the visualization 512 in fields 526, and measures to be included as rows in fields 528.

The display 522 can allow a user to set filters for attributes that will be displayed in the visualization 512. For example, a measure to be used as a filter can be entered in a field 532. A particular condition for the measure in a field 532 can be entered in a field 534, such as showing results having values higher or lower than a particular amount, within a particular range, or meeting other conditions.

A window 538 can display options for linking attributes of different data models or data sources. The selected data models or data sources can be displayed in fields 540. A list of available attributes, in this case dimensions, can be shown in lists 542 for each data model or data source. A user can define a mapping, or join conditions, using fields 546, 548. For example, as shown, the user has selected to match dimension C of Model A with dimension Y of Model B. Additional fields 546, 548 can be provided for other mapped attributes. Options 552 can be provided to allow a user to define how the attributes in the fields 546, 548 will be mapped, such as whether the mapping will be based on an identifier (e.g., a name) of the attribute, or on a description of the attribute (e.g., as specified in a data dictionary or information schema).

The parameters entered in the display 522 are processed and used to generate the visualization 512. As has been described, in response to the user entering values in the display 522 (or upon another action, such as an option to "execute" or "generate" the visualization 512), an analytic query can be generated to obtain data for Model B. If data has not already been obtained in the correct format for a blend query for Model A, an analytic query can be generated for Model A as well. The information provided in the fields 546, 548, 526, 528 can be used to determine data values that should be retrieved, such as in a metadata request of an analytic query. Filter criteria, such entered in the fields 532, 534, can be included in the analytic request of the analytic query. Optionally, other information, such as indicating whether dimension C or dimension W is a "primary" dimension can be provided, which can be used to format results of the analytic query for display in the visualization 512.

The parameters entered in the display 522 are similarly processed to produce a blend query that is executed on the results of the analytic queries. Again, the information in the fields 546, 548, 526, 528 can be used to determine what data values should be retrieved, and be part of a metadata request, and filter criteria of fields 532, 534 can be included in an analytic request, along with information describing how data should be formatted or arranged for the visualization 512.

The visualization 512 illustrates rows 560 that corresponds to dimension C/Y. If dimension C/Y has multiple values for dimension W (of Model B), those values can be shown as rows 562 depending from the corresponding row 560, with values being listed in a column 566 for dimension W. Rows 560 show aggregated measures values corresponding to dimension C/Y, while rows 562 show individual measure values corresponding to the particular values of dimension W. Columns 568 are similar to columns 518, but listing values for both values of dimension C/Y and W.

Example 7—Example Implementation

In a particular example, ANALYTICS CLOUD of SAP SE of Walldorf, Germany, uses SAP HANA EPM-MDS as both an analytic engine and as a blending engine. To feed blending data from different providers into SAP HANA EPM-MDS, the internal structures (e.g., data models and corresponding data) are transformed to external structures, generalized to be independent of the particularities of SAP HANA EPM-MDS and stabilized to form public APIs. That is, as described above, data formats associated with individual data sources are converted to a normalized format. The normalized format can be a serializable format, such as an XML document or a JSON object (or objects). In a particular example, serializable formats are created for a VIEW and for a CUBE.

The VIEW represents the metadata description of the blending data. The metadata can include dimensions, measure dimensions, hierarchy metadata, dimension attributes, aggregation behaviour, and data types, for example. The VIEW metadata can include additional features, such as variables and annotations. The metadata can be provided directly to, or can be obtained indirectly from, referenced entities like a database view or a calculation scenario. Depending on the capabilities of the data provider, the delivered set of metadata might be basic, enriched, or have a comprehensive set of metadata (for example, the entire suite of SAP HANA EPM-MDS VIEW metadata). Thus, depending on the metadata supported/provided by a particular data source of a particular analytic engine, a deep and rich set of metadata can be expressed by a blend of the various data sources.

The more closely each analytic engine can transform its metadata to the normalized VIEW metadata format, the more complete is the data integration/blending and a blending engine, such as SAP HANA EPM-MDS, can operate on the data as natively as possible. In some cases, the analytic engine converts data to a normalized format that can be further processed by the blending engine. For instance, if an analytic engine is able, it converts date values to the data type "daydate," then the conversion of day format is carried out using the blending engine. Otherwise, the analytic engine can convert the data values to a more specific date format, but which may not be as easily processed or changed by the blending engine. The transformation of data with the analytic engine into the VIEW metadata is in that sense layered. The closer to the blending engine the transformation is accomplished, the deeper the integration into the transformed format and the blending engine.

The CUBE represents the blending data described by the VIEW metadata. The CUBE defines, for each dimension, to which axis the dimension belongs, defines dimension hierarchy information, and holds dimension attributes values. The aggregation, units, and exceptions are part of each measure defining, along with their values, the entities set.

In a particular implementation, each query request in SAP ANALYTICS CLOUD is triggered by the FIREFLY layer using the InA protocol and executed on the corresponding analytic engine. So that the blending engine (e.g., SAP HANA EPM-MDS) can understand and operate on top of the different query result sets of the different analytic engines, each analytic engine provides the query result set in the normalized VIEW and CUBE format.

The VIEW and CUBE format are abstract descriptions of the analytic data and describe the common behaviour. As an example of how data transformation/normalization can be accomplished, the analytic engine for SAP BW can produce a query result that is transformed to that normalized VIEW and CUBE formats. The data can be blended in SAP ANALYTICS CLOUD using SAP HANA EPM-MDS as the blending engine, combining the BW data with data from the SAP HANA EPM-MDS model (also in the VIEW and CUBE formats). The blending engine can be used to perform slicing/dicing operations, drill down/rollup operations, calculated measures with parameters of multiple models, thresholds to mark specific values, cross model filtering to transfer filter defined on one model dimension semantically to other model dimensions (flat to parent-child-hierarchy, parent-child-hierarchy to parent-child-hierarchy), filters, variables, hierarchies, and other operations on the blended data set. Thus, the abstraction of the normalized VIEW and CUBE formats can be used as a kind of core model.

It is now possible to blend multiple live models—multiple live remote SAP BW with multiple live remote SAP HANA in any kind of combination—and expose the live data in one table/chart. Data acquisition from individual data sources is not needed anymore as part of data processing and visualization.

Example 8—Summary

The present disclosure describes how to combine data from multiple models (account and/or measures and/or live data) of different analytic engines into one chart/table as a basis for further harmonized operations using a blending engine operating on blended data. The flexibility of a combined data set, whether the data is acquired data or live data, from multiple models of different analytic engines together allows for new view and operations on the data—whether for reporting, planning, or predictive purpose. It is now easy to upload data from a file and combine such data with on-premise driven warehouse data, simulate master data changes, or simulate hierarchy changes. The combined data set can be used as a playground until the actual data gets enhanced or modified (actual versus planned data). It is not necessary to replicate data from one analytic engine to another; the operations are executed on live data models by the blending engine. The integral view of the data provided by the present disclosure is a completely new representation which allows new operations.

Example 9—Example Operations

Figure 6:
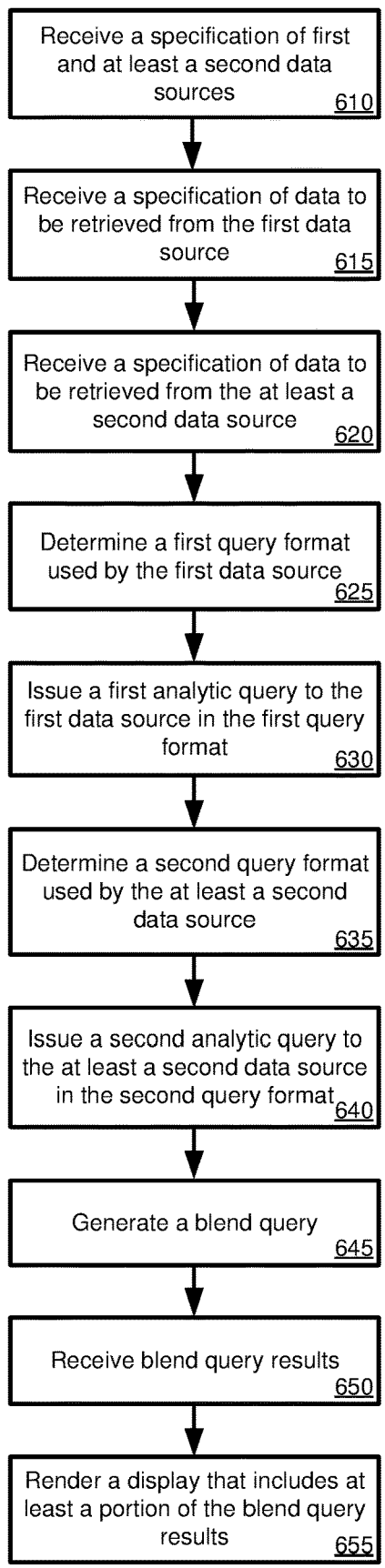
FIGS. 6-8 illustrate operations in various disclosed embodiments of executing blend queries.

FIG. 6 is a flowchart of a method 600 that can be executed by a computing system that facilitates blending data from multiple sources, where the data from the data sources is in a plurality of formats. The method 600 can be executed, for example, at least in part by the data retrieval orchestrator 110 of FIG. 1. At 610, a specification of a first data source and at least a second data source is received. A specification of data to be retrieved from the first data source is received at 615. A specification of data to be retrieved from the at least a second data source is received at 620. At 625, a first query format (e.g., execution format or protocol) used by the first data source is determined. A first analytic query in the first query format is issued to the first data source at 630. At 635, a second query format used by the at least a second data source is determined. The first data source and the at least a second data source use one or both of different data schemas or different query formats. A second analytic query in the second query format is issued to the at least a second data source at 640. A blend query is generated at 645, where the blend query specifies data to be retrieved from data retrieved in response to the first analytic query and the second analytic query. The blend query is configured to be executed on data having a common schema. At 650, blend query results are received. A display is rendered at 655 that includes at least a portion of the blend query results.

Figure 7:
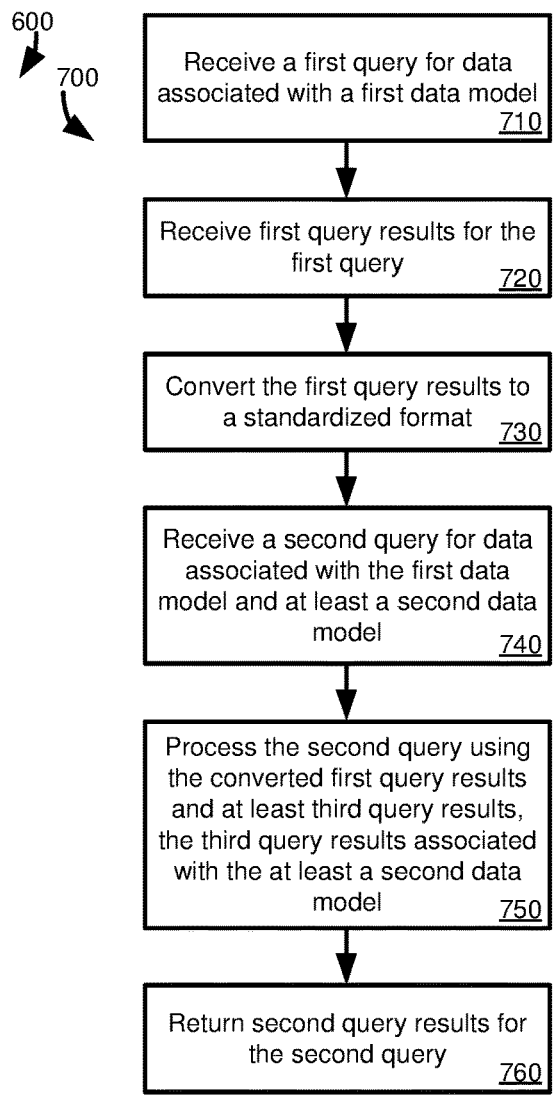

FIG. 7 presents a flowchart of a method 700 for producing query results from data stored in first and second data models. The method 700 can be performed in the computing environment 100 of FIG. 1. At 710, a first query is received for data associated with a first data model. First query results for the first query are received at 720. At 730, the first query results are converted to a standardized format. A second query is received at 740. The second query is for data associated with the first data model and for data associated with at least a second data model. At 750, the second query is processed using the converted first query results and at least third query results. The at least third query results are for data associated with the at least a second data model. Second query results for the second query are returned at 760.

Figure 8:
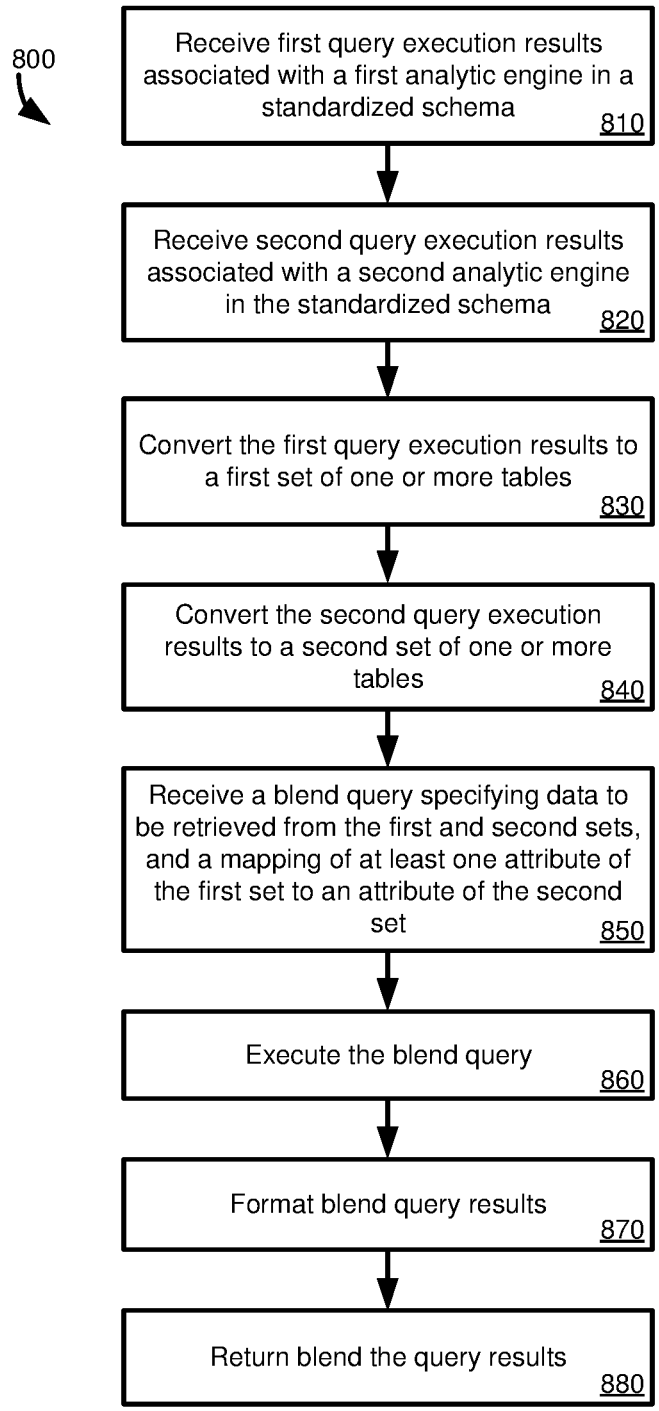

FIG. 8 is a flowchart of a method 800 for executing a blend query on data retrieved from a plurality of analytic engines. The method 800 can be performed in the computing environment 100 of FIG. 1. At 810, first query execution results are received. The first query execution results are associated with a first analytic engine and are in a standardized schema. Second query execution results are received at 820. The second query execution results are associated with a second analytic engine and are in the standardized schema. At 830, the first query execution results are converted to a first set of one or more tables. At 840, the second query execution results are converted to a second set of one or more tables.

A blend query is received at 850. The blend query specifies data to be retrieved from the first set of one or more tables and the second set of one or more tables. The blend query also specifies how at least one attribute of the first set of one or more tables should be mapped to an attribute of the second set of one or more tables. The blend query is executed at 860. The executing includes selecting at least a portion of data maintained in the first set of tables and at least a portion of data maintained in the second set of tables. At 870, the blend query execution results are formatted in a manner specified at least in part by the blend query. Blend query results are returned at 880 in response to receiving the blend query.

Example 10—Computing Systems

Figure 9:
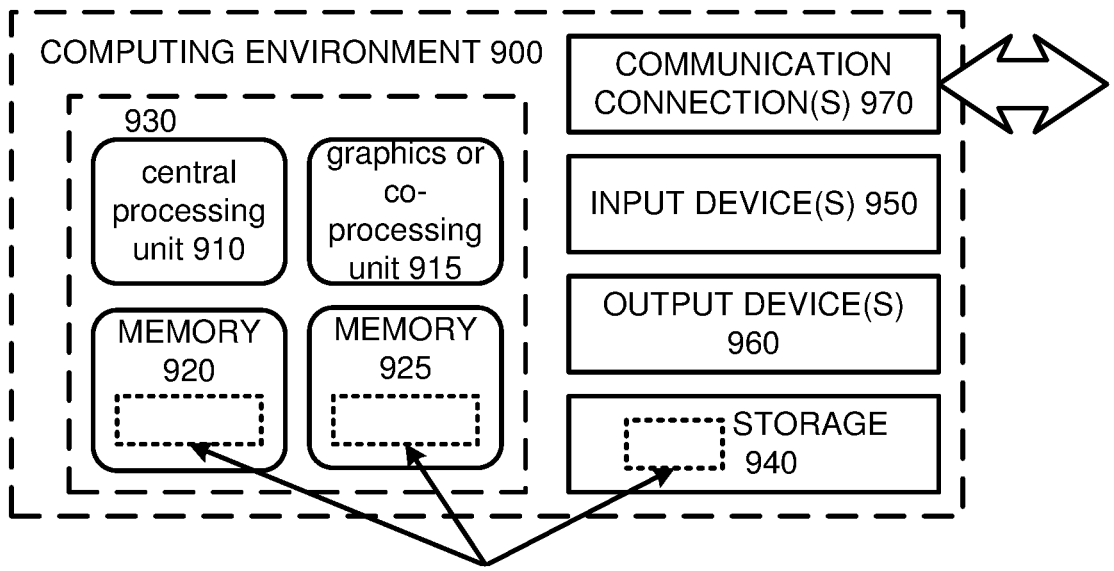
FIG. 9 is a diagram of an example computing system in which some described embodiments can be implemented.

FIG. 9 depicts a generalized example of a suitable computing system 900 in which the described innovations may be implemented. The computing system 900 is not intended to suggest any limitation as to scope of use or functionality of the present disclosure, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing components of the computing architecture 100 of FIG. 1, including as described in Examples 1-9. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing system 900.

The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 10:
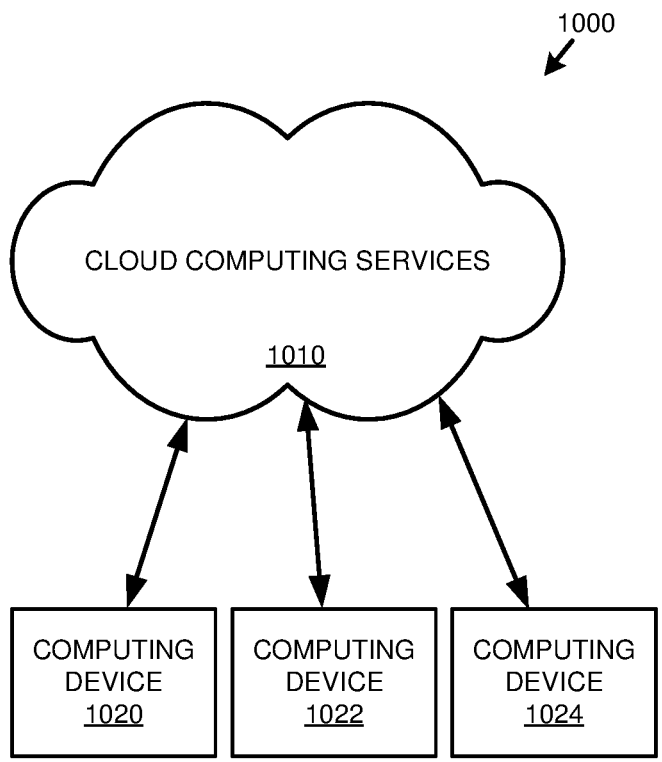
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operators (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C, C++, C #, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   memory;
   one or more processing units coupled to the memory; and
   one or more computer readable storage media storing instructions that, when executed, cause the computing system to perform operations comprising:
   receiving a specification of a first data source and at least a second data source;
   receiving a specification of data to be retrieved from the first data source;
   receiving a specification of data to be retrieved from the at least a second data source;
   determining a first query format used by the first data source;
   issuing a first analytic query to the first data source in the first query format;
   in response to the issuing the first analytic query to first data source, receiving from the first data source: (1) a first schema comprising a metadata description of data retrieved in response to the first analytic query; and (2) a second schema comprising metadata and retrieved values of the data retrieved in response to the first analytic query;
   determining a second query format used by the at least a second data source, wherein the first data source and the at least a second data source use one or both of different data schemas or different query formats;
   issuing a second analytic query to the at least a second data source in the second query format;
   in response to the issuing the second analytic query to the at least a second data source, receiving from the at least a second data source: (1) a third schema comprising a metadata description of data retrieved in response to the second analytic query; and (2) a fourth schema comprising metadata and retrieved values of the data retrieved in response to the second analytic query;
   generating a blend query, the blend query specifying data to be retrieved from data retrieved in response to the first analytic query and the second analytic query, the blend query configured to be executed on data have a common schema;
   receiving blend query results; and
   rendering a display that comprises at least a portion of the blend query results.

2. The computing system of claim 1, wherein the first analytic query comprises a metadata request and an analytic request.

3. The computing system of claim 1, wherein the blend query comprises a metadata request and an analytic request.

4. The computing system of claim 3, wherein the analytic request specifies operations to be applied to data retrieved in response to the metadata request.

5. The computing system of claim 1, the operations further comprising:
   receiving first query results from the first analytic query;
   receiving second query results from the second analytic query;
   storing the first query results in a first set of one or more relational database tables;
   storing the second query results in a second set of one or more relational database tables; and
   executing the blend query against the first set and the second set.

6. The computing system of claim 1, the operations further comprising:
   receiving user input specifying a mapping between data attributes of the first data source and data attributes of the second data source.

7. The computing system of claim 6, the operations further comprising:
   defining a blend model, wherein the blend model comprises the mapping and the blend query is based at least in part on the blend model.

8. The computing system of claim 1, wherein execution results of the first analytic query are provided by the first data source in the common schema.

9. A method, implemented in a computing system comprising one or more processors and one or more memories coupled to the one or more processors, the one or more memories comprising computer-executable instructions for causing the computing system to perform operations comprising:
   receiving a first query for data associated with a first data model;
   receiving first query results for the first query, the first query results comprising (1) a first schema comprising a metadata description of first data retrieved in response to the first query; and (2) a second schema comprising metadata and retrieved values of the first data retrieved in response to the first query;
   converting the first query results to a standardized format to provide converted first query results;

receiving second query results for a second query, the second query results comprising (1) a third schema comprising a metadata description of second data retrieved in response to the second query; and (2) a fourth schema comprising metadata and retrieved values of the second data retrieved in response to the second query, wherein one or both of (1) the first query and the second query are in different query formats or (2) a first data source against which the first query is executed uses a different data schema than a second data source against which the second query is executed;

generating a blend query, the blend query specifying data to be retrieved from data retrieved in response to the first query and the second query, the blend query configured to be executed on data have a common schema;

processing the blend query using the converted first query results and at least the second query results; and returning third query results for the blend query.

10. The method of claim 9, wherein the second query results are in the standardized format.

11. The method of claim 9, further comprising:
converting the second query results to the standardized format to provide converted second query results;
wherein processing the blend query uses the converted second query results.

12. The method of claim 9, wherein the standardized format comprises a VIEW.

13. The method of claim 9, wherein the standardized format comprises a CUBE.

14. The method of claim 9, wherein the standardized format comprises a VIEW and a CUBE.

15. The method of claim 9, further comprising rendering a single visualization from the third query results.

16. The method of claim 15, wherein the visualization comprises a chart or a graph.

17. The method of claim 9, wherein the first data model is associated with a first remote data source.

18. The method of claim 9, wherein the blend query comprises a metadata request and an analytic request.

19. One or more computer-readable storage medium comprising instructions that, when loaded into a memory of a computing device and executed on the computing device, cause the computing device to perform operations comprising:

receiving first query execution results for a first query associated with a first analytic engine in a first, the first schemata comprising (1) a first schema comprising a metadata description of data retrieved in response to the first query; and (2) a second schema comprising metadata and retrieved values of the data retrieved in response to the first query;

receiving second query execution results for a second query associated with a second analytic engine in a second schemata, the second schemata comprising (1) a third schema comprising a metadata description of data retrieved in response to the second query; and (2) a fourth schema comprising metadata and retrieved values of the data retrieved in response to the second query;

converting the first query execution results to a first set of one or more tables;

converting the second query execution results to a second set of one or more tables;

receiving a blend query, the blend query specifying data to be retrieved from the first set of one or more tables and the second set of one or more tables, the blend query further specifying how at least one attribute of the first set of one or more tables should be mapped to an attribute of the second set of one or more tables;

executing the blend query, the executing comprising selecting at least a portion of data maintained in the first set of tables and at least a portion of data maintained in the second set of tables;

formatting blend query execution results in a manner specified at least in part by the blend query; and returning blend query execution results in response to the receiving the blend query.

20. The one or more computer-readable storage medium of claim 19, wherein the blend query comprises a metadata request and an analytic request.

* * * * *